(12) United States Patent
Xiao et al.

(10) Patent No.: US 12,449,852 B2
(45) Date of Patent: Oct. 21, 2025

(54) TENSION ADJUSTMENT DEVICE FOR ROLLABLE DISPLAY SOLVING PROBLEMS OF FLEXIBLE SCREENS HAVING WRINKLES AND OTHER ABNORMALITIES

(71) Applicant: Suzhou China Star Optoelectronics Technology Co., Ltd., Jiangsu (CN)

(72) Inventors: Chunhua Xiao, Jiangsu (CN); Jun Wang, Jiangsu (CN)

(73) Assignee: Suzhou China Star Optoelectronics Technology Co., Ltd., Jiangsu (CN)

( * ) Notice: Subject to any disclaimer, the term of this patent is extended or adjusted under 35 U.S.C. 154(b) by 0 days.

(21) Appl. No.: 17/623,285

(22) PCT Filed: Dec. 17, 2021

(86) PCT No.: PCT/CN2021/139254
§ 371 (c)(1),
(2) Date: Dec. 28, 2021

(87) PCT Pub. No.: WO2023/103048
PCT Pub. Date: Jun. 15, 2023

(65) Prior Publication Data
US 2024/0036608 A1 Feb. 1, 2024

(30) Foreign Application Priority Data
Dec. 10, 2021 (CN) .......................... 202111505641.9

(51) Int. Cl.
*G06F 1/16* (2006.01)
*G09F 9/30* (2006.01)

(52) U.S. Cl.
CPC ............ *G06F 1/1652* (2013.01); *G09F 9/301* (2013.01)

(58) Field of Classification Search
CPC .... G06F 1/1637; G06F 1/1639; G06F 1/1641; G06F 1/1645; G06F 1/1652; G09F 9/301; G09G 3/30; G09G 3/32; G09G 3/3208; G09G 3/3216; G09G 3/3225; G09G 3/3233; G09G 3/36; G09G 3/3611; G09G 3/3614; G09G 3/3622; G09G 3/3625; G09G 3/364; G09G 3/3644
USPC ....... 345/156–158, 168–169, 76–83, 87–104
See application file for complete search history.

(56) References Cited

U.S. PATENT DOCUMENTS

| | | | |
|---|---|---|---|
| 11,058,018 B1 * | 7/2021 | Yoon | G06F 1/1643 |
| 2016/0147327 A1 | 5/2016 | Choi et al. | |
| 2016/0163242 A1 * | 6/2016 | Lee | G09F 9/301 |
| | | | 40/584 |
| 2016/0187929 A1 * | 6/2016 | Kim | G06F 1/1643 |
| | | | 345/184 |

(Continued)

FOREIGN PATENT DOCUMENTS

| | | |
|---|---|---|
| CN | 107067981 | 8/2017 |
| CN | 107680489 | 2/2018 |

(Continued)

*Primary Examiner* — Ke Xiao
*Assistant Examiner* — Nelson Lam (57) ABSTRACT

A tension adjustment device and a rollable display device are disclosed. The tension adjustment device includes a body, at least two adjustment members, and a driving device. The driving device drives the at least two adjustment members to be close to or away from the body to retract or expand the tension adjustment device, so a degree of tension of a rolled product can be adjusted.

14 Claims, 6 Drawing Sheets

(56) References Cited

U.S. PATENT DOCUMENTS

| | | | | |
|---|---|---|---|---|
| 2017/0017271 A1* | 1/2017 | Song | .................... | G06F 1/1652 |
| 2017/0196102 A1* | 7/2017 | Shin | ..................... | H05K 5/023 |
| 2018/0014417 A1* | 1/2018 | Seo | .................... | H05K 7/20954 |
| 2019/0236988 A1* | 8/2019 | Lin | ........................ | G09F 9/301 |
| 2020/0337159 A1* | 10/2020 | Yang | ..................... | G06F 1/1652 |
| 2021/0084779 A1* | 3/2021 | Lee | ..................... | H05K 5/0217 |
| 2022/0091636 A1* | 3/2022 | Cho | ...................... | H02K 7/116 |
| 2022/0166861 A1* | 5/2022 | Lim | .................... | G06F 1/1624 |
| 2022/0342448 A1* | 10/2022 | Shin | ..................... | G06F 1/1624 |

FOREIGN PATENT DOCUMENTS

| | | |
|---|---|---|
| CN | 110138916 | 8/2019 |
| CN | 110185895 | 8/2019 |
| CN | 110534024 | 12/2019 |
| CN | 113530961 | 10/2021 |
| CN | 214587774 | 11/2021 |
| KR | 10-2016-0062314 | 6/2016 |

\* cited by examiner

TENSION ADJUSTMENT DEVICE FOR ROLLABLE DISPLAY SOLVING PROBLEMS OF FLEXIBLE SCREENS HAVING WRINKLES AND OTHER ABNORMALITIES

RELATED APPLICATIONS

This application is a National Phase of PCT Patent Application No. PCT/CN2021/139254 having International filing date of Dec. 17, 2021, which claims the benefit of priority of Chinese Patent Application No. 202111505641.9 filed on Dec. 10, 2021. The contents of the above applications are all incorporated by reference as if fully set forth herein in their entirety.

FIELD AND BACKGROUND OF THE INVENTION

The present disclosure relates to a tension adjustment device and a rollable display device.

A history of development of display devices can actually be said to be a history of development of screens. With development of technology, although smart display devices can basically meet the needs of users nowadays, the needs of major display device manufacturers to improve user experiences and functionality are constantly increasing. In the past two years, display device manufacturers have continuously invested in research and development and product upgrades in ease of use design, full screen, and camera quality, resulting in more avant-garde folding screens, scroll screens and other novel display device screens.

Technical problem: in current rollable display devices on the market, a device having spring forces of torsion springs is generally used to realize retracting and unwinding of the scroll screens. During retracting and unwinding processes, uncontrollable retracting and unwinding tension may occur. An overly small tension will cause the scroll screens to become loose and collapse, and eventually cause the scroll screens to have wrinkles and other abnormalities, thereby causing user experiences of the rollable display devices to be poorer. An overly large tension will destroy performances of the scroll screens. As a number of uses increases, it is easy to cause aging of the device having spring forces of torsion springs, causing a tension to become smaller, and a phenomenon such as slipping occurs, thereby causing the scroll screens to become loose and collapse, and eventually causing the scroll screens to have wrinkles and other abnormalities, thereby causing user experiences of the rollable display devices to be poorer.

SUMMARY OF THE INVENTION

An objective of the present disclosure is to provide a tension adjustment device and a rollable display device, which can solve problems of scroll screens having wrinkles and other abnormalities, thereby causing user experiences of rollable display devices to be poorer, caused by uncontrolled tension of current rollable display devices.

In order to solve the above problems, the present disclosure provides a tension adjustment device, which includes: a body; at least two adjustment members uniformly and slidably connected to the body; and a driving device driving the at least two adjustment members to be close to or away from the body.

Further, surfaces of the at least two adjustment members away from the body are curved surfaces.

Further, the driving device includes: an adjusting gear rotatably connected to the body and provided with at least two adjusting slots; and a driving gear meshing with the adjusting gear; wherein, each of the at least two adjustment members is provided with an adjusting pin slidably inserted into the at least two adjusting slots.

Further, the adjusting pin corresponds to the at least two adjusting slots by one to one.

Further, the at least two adjusting slots are arc-shaped.

Further, a circle enclosed by one end of each of the at least two adjusting slots close to a center of the adjusting gear and the adjusting gear are concentric circles, and another circle enclosed by another end of each of the at least two adjusting slots away from the center of the adjusting gear and the adjusting gear are concentric circles.

Further, the driving device further includes a drive motor driving the driving gear to rotate.

Further, the drive motor is provided with a detection device.

Further, a rotating direction of the driving gear is opposite to a rotating direction of the adjusting gear.

In order to solve the above problems, the present disclosure provides a rollable display device, which includes: the tension adjustment device mentioned in the present disclosure, and a flexible display screen wrapped around adjustment members of the tension adjustment device.

Beneficial effect: the driving device drives the at least two adjustment members to be close to or away from the body to retract or expand the tension adjustment device, so the tension adjustment device of the present disclosure can adjust a degree of tension of a rolled product. An overly small tension causing the rolled product to become loose and collapse, and eventually causing the rolled product to have wrinkles and other abnormalities, thereby affecting user experiences of the rolled product, can be prevented, and an overly large tension causing abnormalities such as stretching the rolled product to break can be prevented. By adjusting a degree of rolling tension of the flexible display screen by the tension adjustment device, the rollable display device of the present disclosure can prevent following problems: a slipping phenomenon of current retracting and unwinding devices as a number of uses increases, which causes flexible display screens to become loose and collapse, and eventually causes the flexible display screens to have wrinkles and other abnormalities, thereby causing user experiences of rollable display devices to be poorer.

BRIEF DESCRIPTION OF THE SEVERAL VIEWS OF THE DRAWINGS

The accompanying figures to be used in the description of embodiments of the present disclosure will be described in brief to more clearly illustrate the technical solutions of the embodiments. The accompanying figures described below are only part of the embodiments of the present disclosure, from which those skilled in the art can derive further figures without making any inventive efforts.

Elements in the drawings are designated by reference numerals listed below.

1000: rollable display device; 100: tension adjustment device;
200: flexible display screen; 300: case;
400: clamping member; 301: side panel;
1: body; 2: adjustment member;
3: driving device;
11: chassis; 12: groove;
13: first protrusion; 14: second protrusion;
21: adjusting pin;
31: adjusting gear; 32: driving gear;
311: adjusting slot; and 321: connecting rod.

DESCRIPTION OF SPECIFIC EMBODIMENTS OF THE INVENTION

The preferred embodiments of the present disclosure are described in detail below with reference to the accompanying drawings. The specific embodiments described with reference to the attached drawings are all exemplary and are intended to illustrate and interpret the present disclosure to make the skilled in the art easier to understand how to implement the present disclosure. The disclosure herein provides many different embodiments or examples for realizing different structures of the present disclosure. They are only examples and are not intended to limit the present disclosure.

In the description of the present disclosure, it should be understood that terms such as "upper," "lower," "front," "rear," "left," "right," "inside," "outside," "side," as well as derivative thereof should be construed to refer to the orientation as described or as shown in the drawings under discussion. These relative terms are for convenience of description, do not require that the present disclosure be constructed or operated in a particular orientation, and shall not be construed as causing limitations to the present disclosure.

In the accompanying drawings, wherein the identical or similar reference numerals constantly denote the identical or similar elements or elements having the identical or similar functions. In the drawings, structurally identical components are denoted by the same reference numerals, and structural or functionally similar components are denoted by like reference numerals. Moreover, a size and a thickness of each component shown in the drawings are arbitrarily shown for ease of understanding and description, and the present disclosure does not limit the size and thickness of each component.

Embodiment

Figure 1:
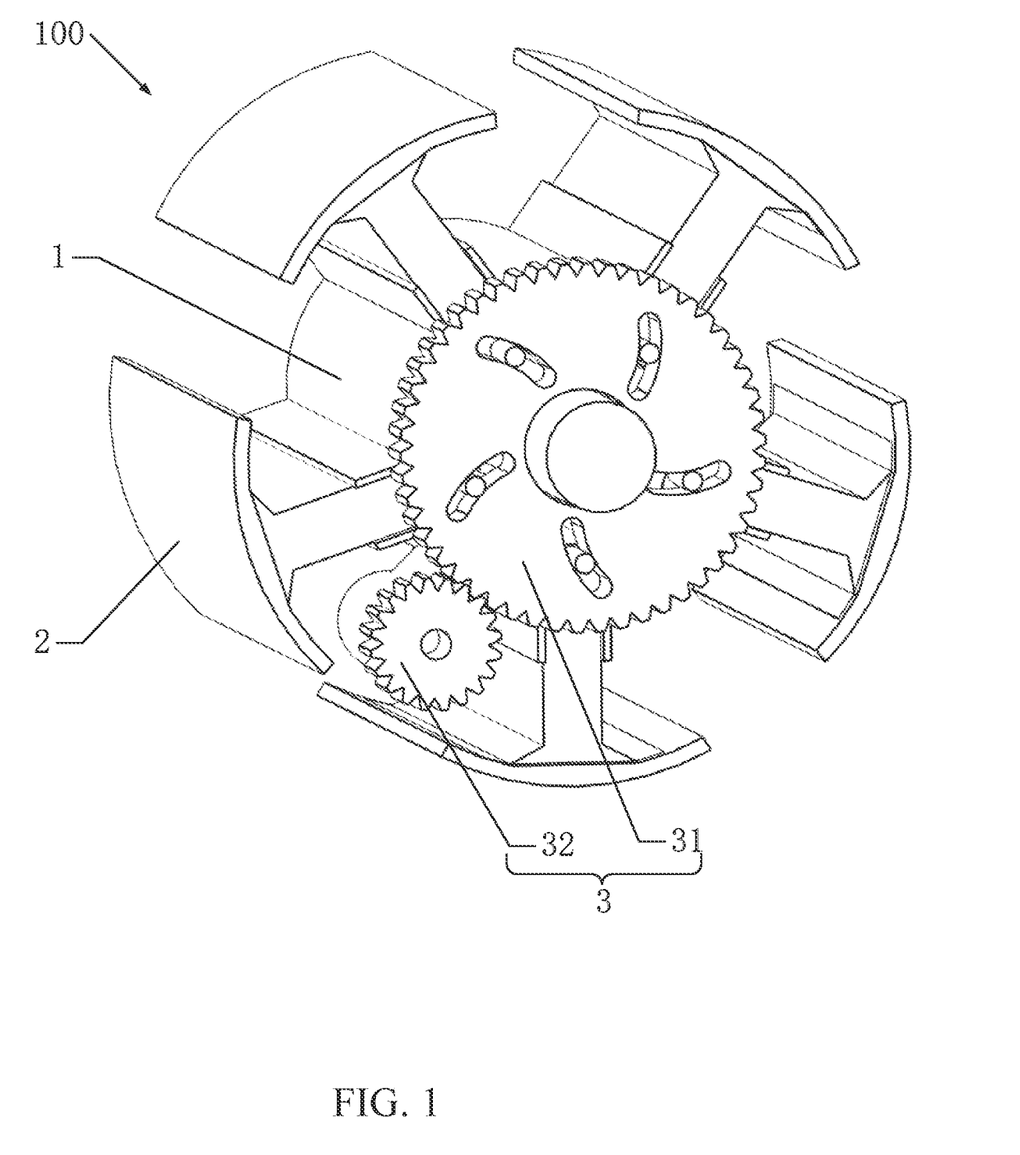
FIG. 1 is a schematic structural diagram of a tension adjustment device according to an embodiment of the present disclosure.

As shown in FIG. 1, a tension adjustment device 100 is provided in this embodiment. The tension adjustment device 100 includes a body 1, at least two adjustment members 2, and a driving device 3.

The driving device 3 drives the at least two adjustment members 2 to be close to or away from the body 1 to retract or expand the tension adjustment device 100, so a degree of tension of a flexible member wrapped around the tension adjustment device 100 can be adjusted. An overly small tension causing the flexible member to become loose and collapse, and eventually causing the flexible member to have wrinkles and other abnormalities, thereby affecting user experiences of the flexible member, can be prevented, and an overly large tension causing abnormalities such as stretching the flexible member to break can be prevented. Therefore, it can prevent following problems: a slipping phenomenon of current retracting and unwinding devices as a number of uses increases, which causes the flexible member to become loose and collapse, and eventually causes the flexible member to have wrinkles and other abnormalities, thereby causing user experiences of the flexible member to be poorer.

Figure 2:
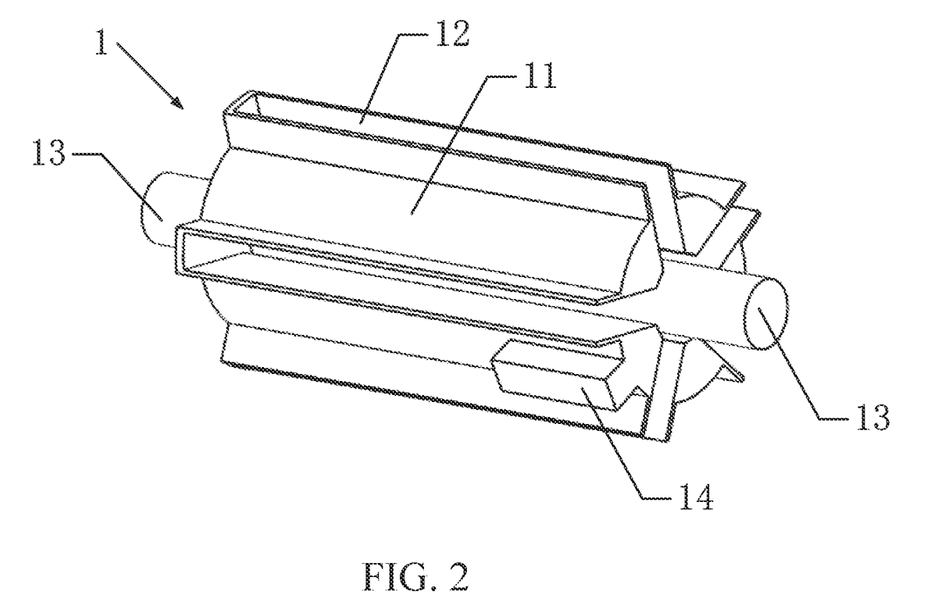
FIG. 2 is a schematic structural diagram of a body of the tension adjustment device according to an embodiment of the present disclosure.

As shown in FIG. 2, the body 1 includes a chassis 11, at least two grooves 12, two first protrusions 13, and a second protrusion 14.

Wherein, the chassis 11 is cylindrical. The at least two grooves 12 are uniformly disposed on a side surface of the chassis 11. The at least two grooves 12 may be integrally formed with the chassis 11, or may be fixed on the side surface of the chassis 11 by fixing members such as screws. In this embodiment, the body 1 includes five grooves 12.

The two first protrusions 13 are respectively fixed to two bottom surfaces of the chassis 11. The two first protrusions 13 are cylindrical, and central axes of the two first protrusions 13 overlap a central axis of the chassis 11. The second protrusion 14 is disposed on a side surface of the chassis 11 and is located between two adjacent grooves 12.

As shown in FIG. 1, the at least two adjustment members 2 are slidably connected to the body 1. Specifically, the at least two adjustment members 2 are slidably connected to the at least two grooves 12 of the body 1. The at least two adjustment members 2 are disposed uniformly and corresponding to the at least two grooves 12 by one to one.

Figure 3:
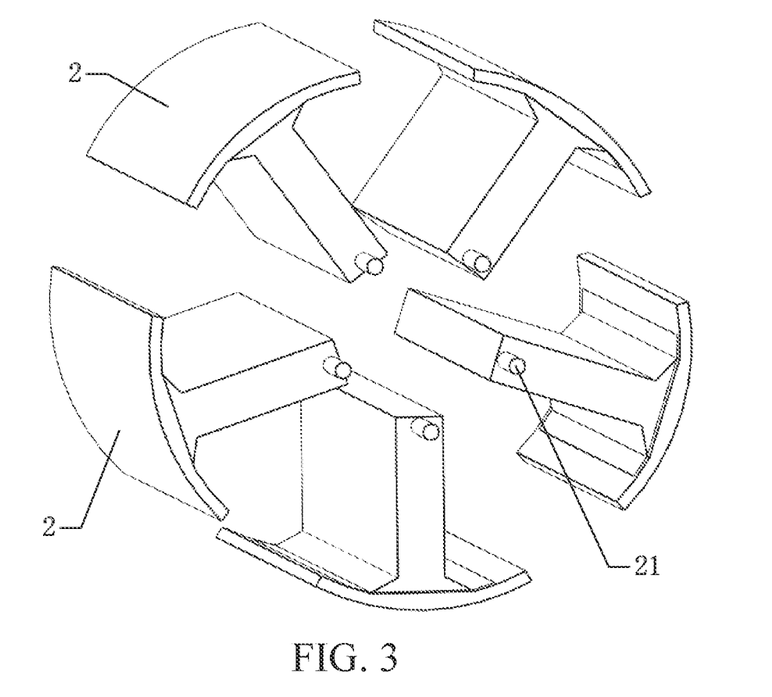
FIG. 3 is a schematic structural diagram of an adjustment member of the tension adjustment device according to an embodiment of the present disclosure.

As shown in FIGS. 1 and 3, surfaces of the at least two adjustment members 2 away from the body 1 are curved surfaces. Therefore, when the flexible member is wrapped around the tension adjustment device 100, the flexible member is rolled into a circle, thereby being beneficial to retraction and expansion of the flexible member.

As shown in FIG. 3, each of the at least two adjustment members 2 is provided with an adjusting pin 21.

As shown in FIG. 1, the driving device 3 is mainly configured to drive the at least two adjustment members 2 to be close to or away from the body 1. In this embodiment, the driving device 3 includes an adjusting gear 31 and a driving gear 32.

Wherein, the adjusting gear 31 is rotatably connected to the body 1. Specifically, the adjusting gear 31 is rotatably connected to the two first protrusions 13 of the body 1.

Figure 4:
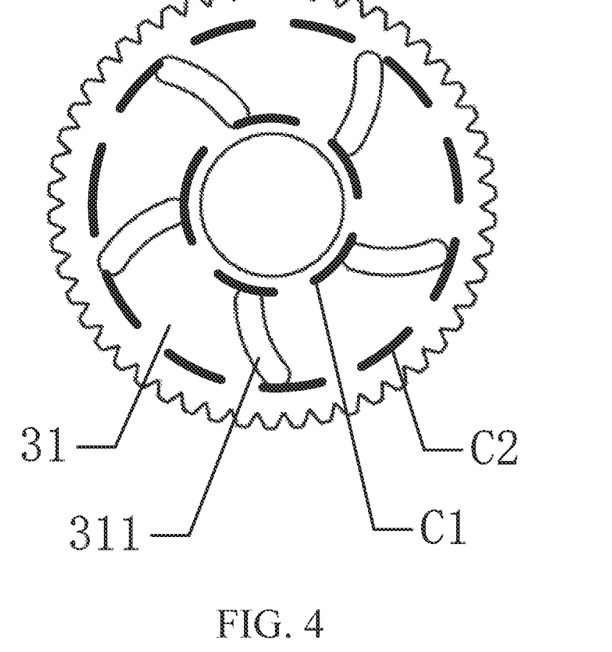
FIG. 4 is a schematic structural diagram of an adjusting gear of the tension adjustment device according to an embodiment of the present disclosure.

As shown in FIGS. 1, 3, and 4, the adjusting gear 31 is provided with at least two adjusting slots 311. Adjusting pins 21 are slidably inserted into the at least two adjusting slots 311. The at least two adjusting slots 311 are disposed corresponding to the adjusting pins 21 by one to one.

As shown in FIG. 4, the at least two adjusting slots 311 are arc-shaped. A circle C1 enclosed by one end of each of the at least two adjusting slots 311 close to a center of the adjusting gear 31 and the adjusting gear 31 are concentric circles, and another circle C2 enclosed by another end of each of the at least two adjusting slots 311 away from the center of the adjusting gear 31 and the adjusting gear 31 are concentric circles.

Figure 5:
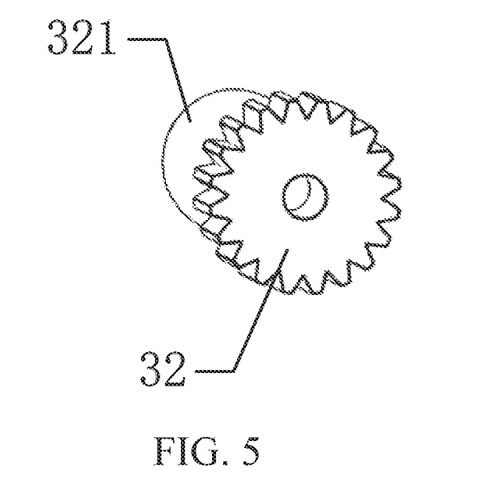
FIG. 5 is a schematic structural diagram of a driving gear of the tension adjustment device according to an embodiment of the present disclosure.

As shown in FIG. 5, the driving gear 32 and the adjusting gear 31 mesh with each other. Specifically, the driving gear 32 is rotatably connected to a connecting rod 321, and the connecting rod 321 is fixedly connected to the second protrusion 14.

Wherein, a rotating direction of the driving gear 32 is opposite to a rotating direction of the adjusting gear 31.

Wherein, the driving device 3 further includes a drive motor (not shown in the figures), which drives the driving gear 32 to rotate. The drive motor can be built into the body 1. In this embodiment, the drive motor is provided with a detection device (not shown in the figures).

In this embodiment, when the flexible member is rolled, forces received by the at least two adjustment members 2 of the tension adjustment device 100 are transmitted to the detection device of the drive motor of the driving gear 32 through the adjusting gear 31. The drive motor outputs a reaction force according to the forces detected by the detection device to maintain a balance of a force system of the tension adjustment device 100.

Figure 6:
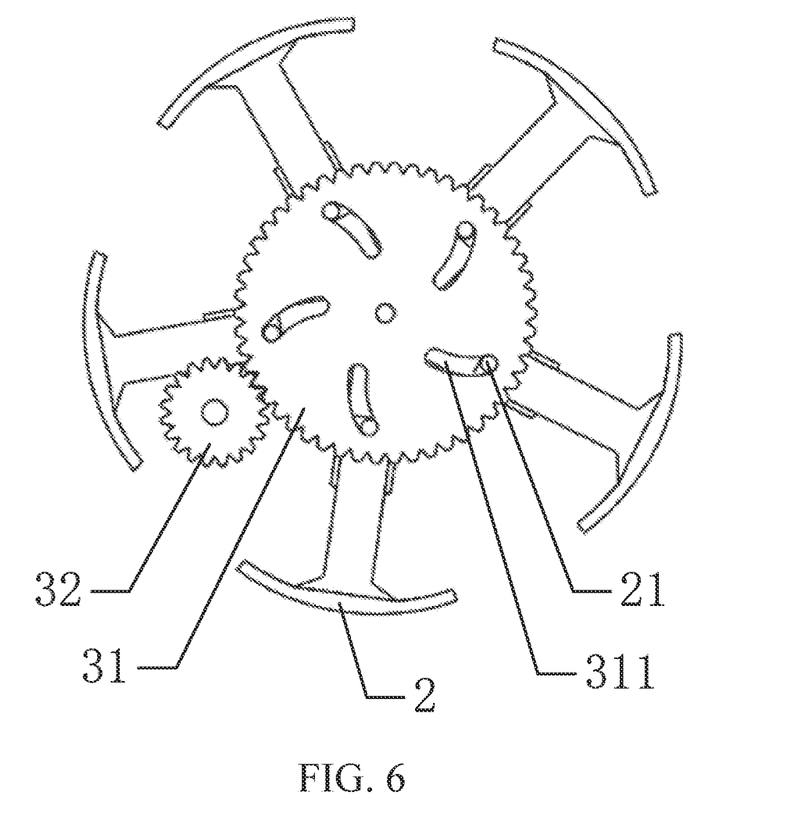
FIG. 6 is a schematic structural diagram of the tension adjustment device of FIG. 1 after expanding.

As shown in FIG. 6, when the detection device of the drive motor detects that a tension on the at least two adjustment members 2 is small, that is the flexible member is loose, the drive motor will drive the driving gear 32 to rotate counterclockwise, and the driving gear 32 drives the adjusting gear 31 to rotate clockwise, so that the adjusting pins 21 can slide away from the center of the adjusting gear 31 in the at least two adjusting slots 311, and the adjusting pins 21 drive the at least two adjustment members 2 to slide away from the body 1 in the at least two grooves 12. Therefore, the tension adjustment device 100 is allowed to expand, thereby adjusting the degree of tension of the flexible member. The overly small tension causing the flexible member to become loose and collapse, and eventually causing the flexible member to have wrinkles and other abnormalities, thereby affecting user experiences of the flexible member, can be prevented. Therefore, it can prevent following problems: the slipping phenomenon of current retracting and unwinding devices as the number of uses increases, which causes the flexible member to become loose and collapse, and eventually causes the flexible member to have wrinkles and other abnormalities, thereby causing user experiences of the flexible member to be poorer.

Figure 7:
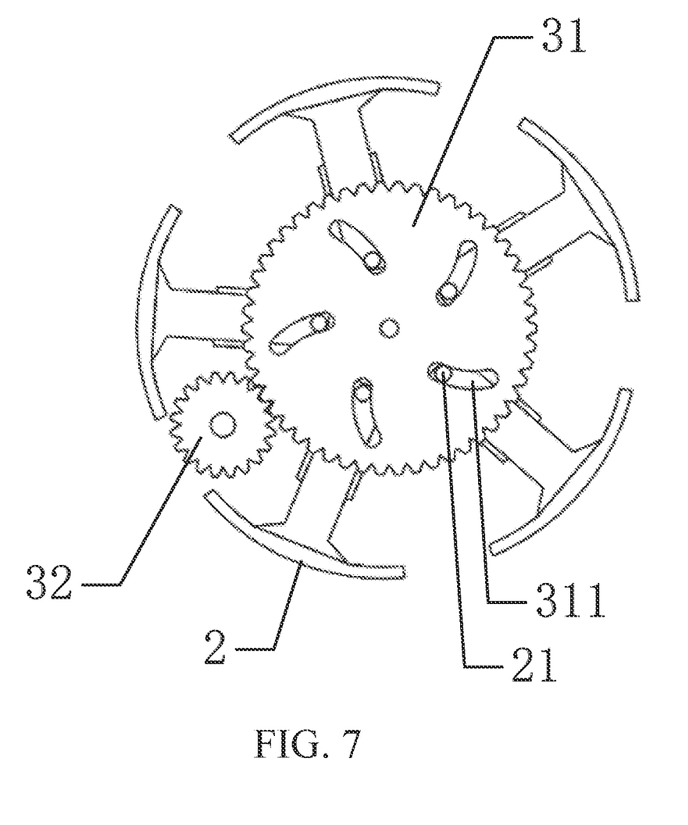
FIG. 7 is a schematic structural diagram of the tension adjustment device of FIG. 1 after retracting.

As shown in FIG. 7, when the detection device of the drive motor detects that the tension on the at least two adjustment members 2 is large, that is the flexible member is tight, the drive motor will drive the driving gear 32 to rotate clockwise, and the driving gear 32 drives the adjusting gear 31 to rotate counterclockwise, so that the adjusting pins 21 can slide close to the center of the adjusting gear 31 in the at least two adjusting slots 311, and the adjusting pins 21 drive the at least two adjustment members 2 to slide close to the body 1 in the at least two grooves 12. Therefore, the tension adjustment device 100 is allowed to retract, thereby adjusting the degree of tension of the flexible member. The overly large tension causing abnormalities such as stretching the flexible member to break can be prevented.

Figure 8:
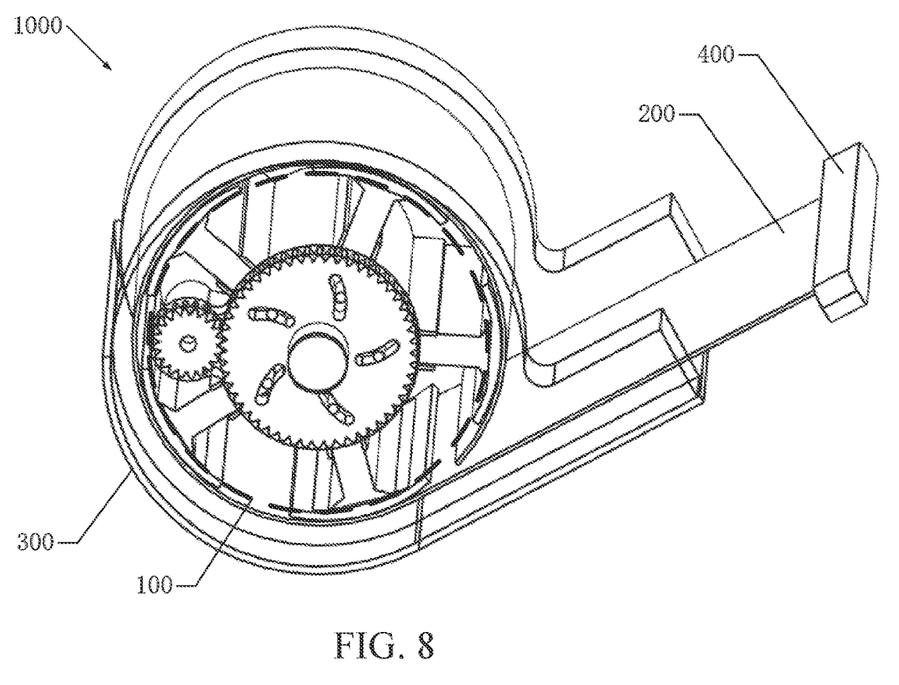
FIG. 8 is a schematic structural diagram of a rollable display device according to an embodiment of the present disclosure.
Figure 9:
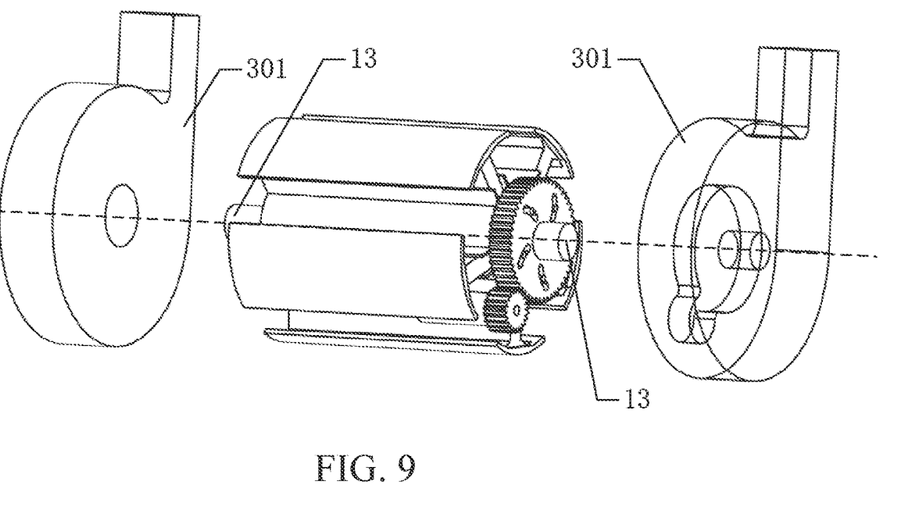
FIG. 9 is a schematic structural diagram of a connection between the tension adjustment device and a side panel of a case according to an embodiment of the present disclosure.

As shown in FIGS. 8 and 9, this embodiment further provides a rollable display device 1000. The rollable display device 1000 includes the tension adjustment device 100, a flexible display screen 200, a case 300, and a clamping member 400.

Wherein, the case 300 has two side panels 301 opposite to each other.

As shown in FIGS. 8 and 9, the tension adjustment device 100 is installed in the case 300. Wherein, the two first protrusions 13 of the tension adjustment device 100 are rotatably connected to the two side panels 301, respectively. Therefore, the tension adjustment device 100 being rotatably connected to the case 300 can be realized.

Wherein, one end of the flexible display screen 200 is wrapped around the tension adjustment device 100, and another end of the flexible display screen 200 is connected to the clamping member 400. In this embodiment, the flexible display screen 200 is an organic light-emitting diode (OLED) display screen.

By adjusting a degree of rolling tension of the flexible display screen 200 by the tension adjustment device 100, the rollable display device 1000 of this embodiment can prevent following problems: the slipping phenomenon of current retracting and unwinding devices as the number of uses increases, which causes flexible display screens 200 to become loose and collapse, and eventually causes the flexible display screens 200 to have wrinkles and other abnormalities, thereby causing user experiences of rollable display devices 1000 to be poorer.

The tension adjustment device and the rollable display device provided in the embodiments of the present disclosure is described in detail above. Specific examples are used herein to explain the principles and implementation of the present disclosure. The descriptions of the above embodiments are only used to help understand the method of the present disclosure and its core ideas; meanwhile, for those skilled in the art, the range of specific implementation and application may be changed according to the ideas of the present disclosure. In summary, the content of the specification should not be construed as causing limitations to the present disclosure.

What is claimed is:

1. A tension adjustment device, comprising:
a body;
at least two adjustment members uniformly and slidably connected to the body; and
a driving device driving the at least two adjustment members to be close to or away from the body;
wherein outer surfaces of the at least two adjustment members away from the body are curved outer surfaces, and a flexible display screen is wrapped around the curved outer surfaces and rolled into a circle,
wherein the driving device comprises:
an adjusting gear rotatably connected to the body and provided with at least two adjusting slots; and
a driving gear meshing with the adjusting gear; and
wherein each of the at least two adjustment members is provided with an adjusting pin slidably inserted into the at least two adjusting slots.

2. The tension adjustment device according to claim 1, wherein the adjusting pin corresponds to the at least two adjusting slots by a one to one correspondence.

3. The tension adjustment device according to claim 2, wherein the at least two adjusting slots are arc-shaped.

4. The tension adjustment device according to claim 3, wherein a circle enclosed by one end of each of the at least two adjusting slots close to a center of the adjusting gear and the adjusting gear are concentric circles, and another circle enclosed by another end of each of the at least two adjusting slots away from the center of the adjusting gear and the adjusting gear are concentric circles.

5. The tension adjustment device according to claim 1, wherein the driving device further comprises:
   a drive motor driving the driving gear to rotate.

6. The tension adjustment device according to claim 5, wherein the drive motor is provided with a detection device.

7. The tension adjustment device according to claim 1, wherein a rotating direction of the driving gear is opposite to a rotating direction of the adjusting gear.

8. A rollable display device, comprising:
   a tension adjustment device, and
   a flexible display screen;
   wherein the tension adjustment device comprises:
     a body;
     at least two adjustment members uniformly and slidably connected to the body; and
     a driving device driving the at least two adjustment members to be close to or away from the body;
   wherein outer surfaces of the at least two adjustment members away from the body are curved outer surfaces, and the flexible display screen is wrapped around the curved outer surfaces and rolled into a circle,
   wherein the driving device comprises:
     an adjusting gear rotatably connected to the body and provided with at least two adjusting slots; and
     a driving gear meshing with the adjusting gear; and
   wherein each of the at least two adjustment members is provided with an adjusting pin slidably inserted into the at least two adjusting slots.

9. The rollable display device according to claim 8, wherein the adjusting pin corresponds to the at least two adjusting slots by a one to one correspondence.

10. The rollable display device according to claim 9, wherein the at least two adjusting slots are arc-shaped.

11. The rollable display device according to claim 10, wherein a circle enclosed by one end of each of the at least two adjusting slots close to a center of the adjusting gear and the adjusting gear are concentric circles, and another circle enclosed by another end of each of the at least two adjusting slots away from the center of the adjusting gear and the adjusting gear are concentric circles.

12. The rollable display device according to claim 8, wherein the driving device further comprises:
    a drive motor driving the driving gear to rotate.

13. The rollable display device according to claim 12, wherein the drive motor is provided with a detection device.

14. The rollable display device according to claim 8, wherein a rotating direction of the driving gear is opposite to a rotating direction of the adjusting gear.

* * * * *